United States Patent
Brewer

(10) Patent No.: US 6,680,099 B1
(45) Date of Patent: *Jan. 20, 2004

(54) ENHANCING DAMAGE TOLERANCE OF ADHESIVE BONDS

(75) Inventor: John C. Brewer, Norfolk, MA (US)

(73) Assignee: The United States of America as represented by the Secretary of Transportation, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/787,512

(22) Filed: Jan. 21, 1997

Related U.S. Application Data

(62) Division of application No. 08/546,388, filed on Oct. 20, 1995, now Pat. No. 5,626,934.

(51) Int. Cl.[7] .............................. B32B 3/26; B32B 35/00
(52) U.S. Cl. ............................ 428/63; 428/63; 428/58; 428/458; 428/465; 156/94
(58) Field of Search ........................... 428/63, 58, 458, 428/465; 156/94

(56) References Cited

U.S. PATENT DOCUMENTS

| | | | | | |
|---|---|---|---|---|---|
| 3,661,683 A | * | 5/1972 | Engel et al. | ................. | 156/580 |
| 4,591,511 A | * | 5/1986 | Peebles, Jr. | ................. | 427/142 |
| 4,759,812 A | * | 7/1988 | Miller | ......................... | 428/63 |
| 4,912,594 A | * | 3/1990 | Bannink, Jr. et al. | ....... | 361/218 |
| 5,030,493 A | * | 7/1991 | Rich | ............................. | 156/94 |
| 5,298,099 A | * | 3/1994 | Hoffman, Sr. | ................ | 156/94 |
| 5,424,105 A | * | 6/1995 | Stewart | ........................ | 428/40 |

\* cited by examiner

*Primary Examiner*—Terrel Morris
*Assistant Examiner*—Victor Chang
(74) *Attorney, Agent, or Firm*—Otto M. Wildensteiner

(57) ABSTRACT

A means and method of enhancing the damage tolerance of adhesive bonds by introducing gaps in the adhesive to divide the adhesive layer into discrete regions. The gaps are created by placing strips of barrier material between the two adherends before the adhesive is put in place and cured. If the two adherends begin to debond along the interface between one of the adherends and the adhesive, the gap arrests the debonding process.

2 Claims, 4 Drawing Sheets

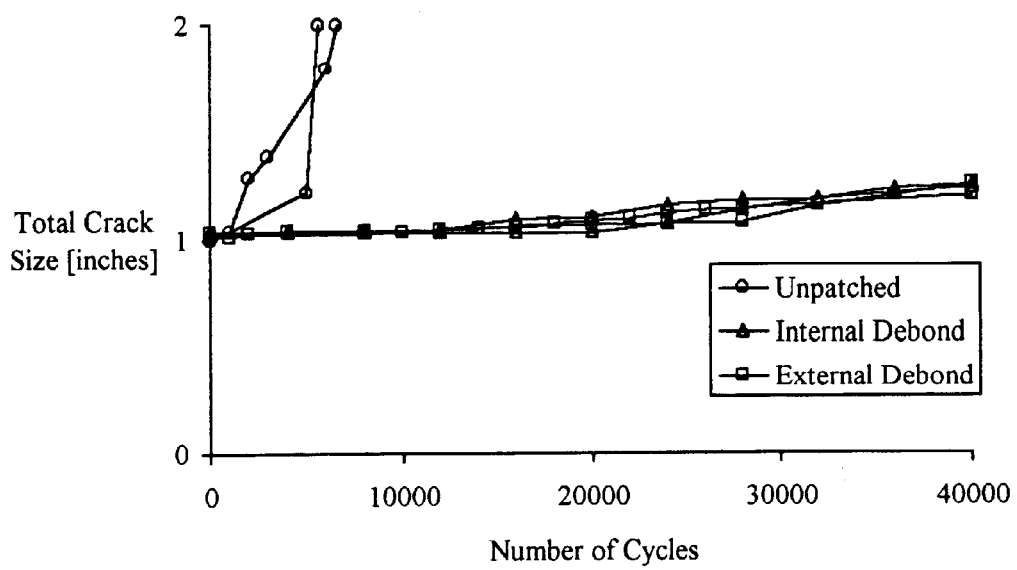
FIGURE 4
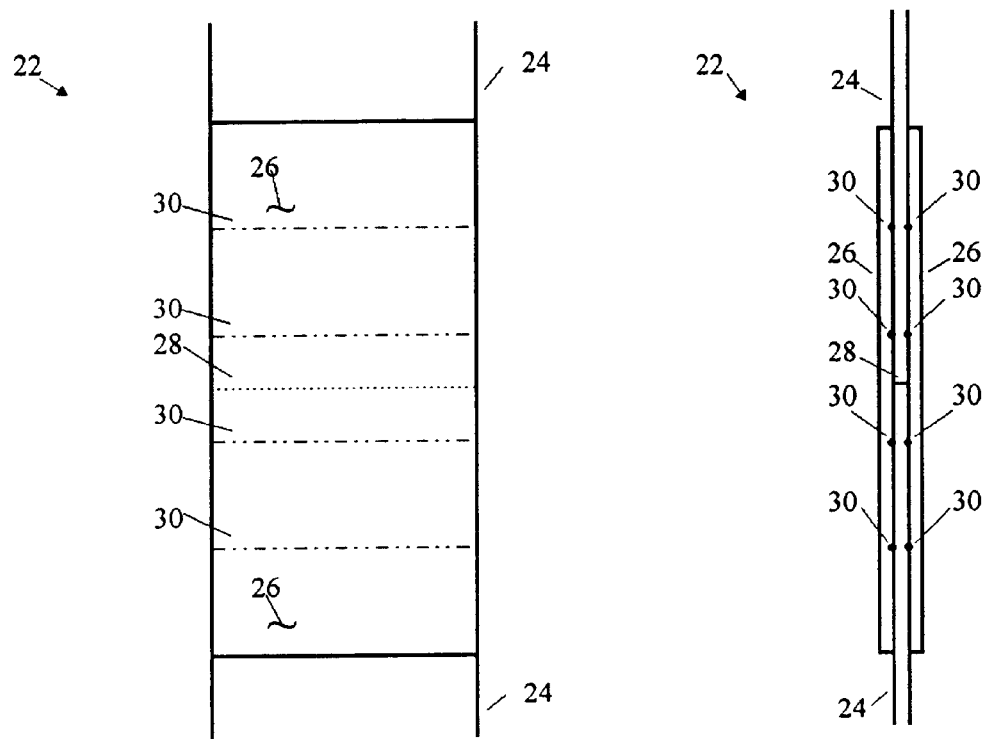
FIGURE 5
FIGURE 6

ENHANCING DAMAGE TOLERANCE OF ADHESIVE BONDS

The present application is a divisional of U.S. patent application Ser. No. 08/546,388 filed Oct. 20, 1995 now U.S. Pat. No. 5,626,934.

STATEMENT OF GOVERNMENT INTEREST

The present invention may be made or used by or on behalf of the Government of the United States without the payment of any royalties thereon or therefor.

INTRODUCTION

Numerous adhesive bonding applications require tolerance of induced damage wherever an undetected debond can exist. The Federal Aviation Administration has mandated damage tolerance for all principal structural elements of transport category aircraft, as well as any repairs to these elements. Composite patch repairs of structural cracks have been shown to be extremely effective, yet they need a damage tolerant bonding mechanism in order to be certified for transport aircraft.

In practical terms, aircraft repairs should also be quick, durable, and relatively inexpensive. Some aircraft, primarily military, have used bonded composite patches to repair structural cracks. These patches have two beneficial effects. First, they provide an alternate load path. The patches are primarily unidirectional such that the fibers bridge the crack, transferring much of the load out of the plane of the damaged component. Second, they provide a virtual limit to the maximum crack opening. Both of these effects limit the stress intensity factor at the crack tip, which in turn limits the crack extension experienced in each load cycle. Patches are designed to keep the crack size well below its critical value during the remaining economic life of the aircraft. Boron/epoxy patches are used most often because of their high stiffness and the ability to monitor crack size through the patch using eddy current technology.

At present composite patches are generally limited to cracks small enough that they will not, over the course of several inspection periods, grow to a critical size for the largest expected lifetime load. In this way, even if the patch were somehow completely ineffective, the damage could be monitored and repaired via another method long before operational safety was jeopardized. Patches applied to small cracks could still economically extend the component's lifetime, but could not be counted on to perform as primary structure.

OBJECTS

Accordingly, it is an object of the present invention to provide a method of achieving structural redundancy and damage tolerance in any bonded joint.

It is a further object to provide such a method that is simple to use.

It is a further object to provide such a method that is economical.

It is a further object to provide such a method that can be applied to patches on aircraft components.

BRIEF DESCRIPTION OF THE DRAWINGS

FIG. 4 shows the overall results of the tests on the aluminum specimens.

FIG. 5 shows a front view of the specimens used in the fiberglass/epoxy tests.

FIG. 6 shows a side view of the specimens used in the fiberglass/epoxy tests.

SUMMARY

Briefly, the present invention is the means and method of enhancing damage tolerance of bonded joints by introducing gaps in the bonded joint between two adherends. These gaps interrupt the debonding process, thereby preventing the entire bond from coming apart. This is important when a patch is adhesively bonded over a crack in an aircraft skin, for example. If one edge or corner of the patch or other region of the patch were to become debonded, the debonding could progress through the entire joint up to the crack, thereby rendering the patch ineffective. By introducing gaps in the adhesive, the debonding would be stopped before the entire patch failed. Alternatively, if the force causing the debonding were excessive, the gaps would slow down the process enough to allow it to be found during routine inspections.

DESCRIPTION OF THE PREFERRED EMBODIMENT

Figures 1, 2:
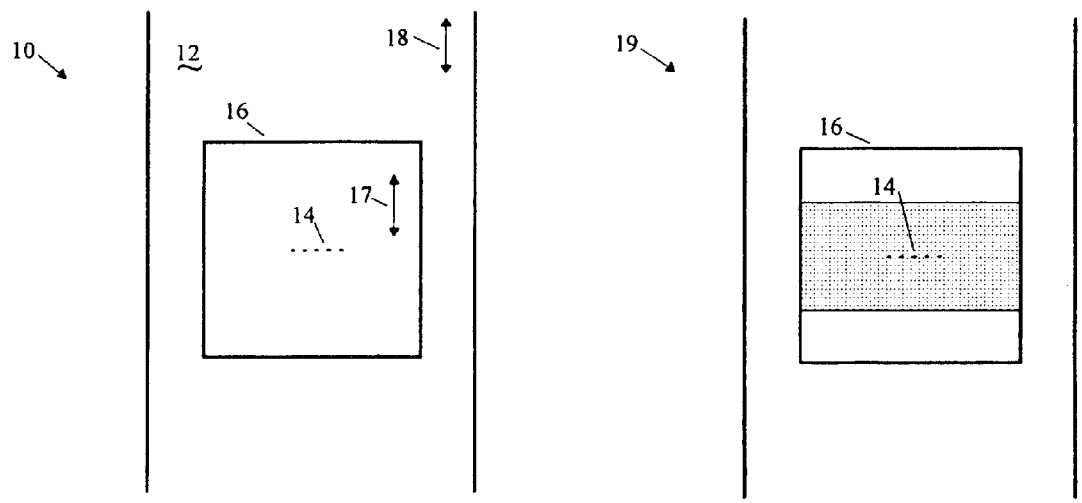
FIG. 1 shows an overall view of the experimental apparatus of the present invention.
FIGS. 2 and 3 show the difference between internal and external debonds and the test specimens used for tests on cracked aluminum.

FIG. 1 shows the overall layout of the experimental apparatus 10 used on the tests simulating a crack in an aluminum aircraft skin. Aluminum sheet 12 simulates the skin of the aircraft with crack 14 in it that is covered with patch 16. Patch 16 is a unidirectional graphite/epoxy patch, with the direction of the fibers 17 parallel to the direction of the applied load 18 and perpendicular to crack 14. Most skin patches on military planes are thought to be boron/epoxy, but graphite/epoxy was used in the tests primarily because it is less opaque to X-ray inspection used in the debond growth tests. The adhesive used to bond patch 16 to sheet 12 is "Cytec® FM-73M®", a proprietary modified epoxy film made by Cytec Engineered Materials of Havre de Grace, Maryland; this is recommended by the manufacturer for use with boron/epoxy patches, hence was used for the tests. Priming, bonding, and curing procedures in accordance with the manufacturer's instructions were used in preparing all of the specimens.

Figure 3:
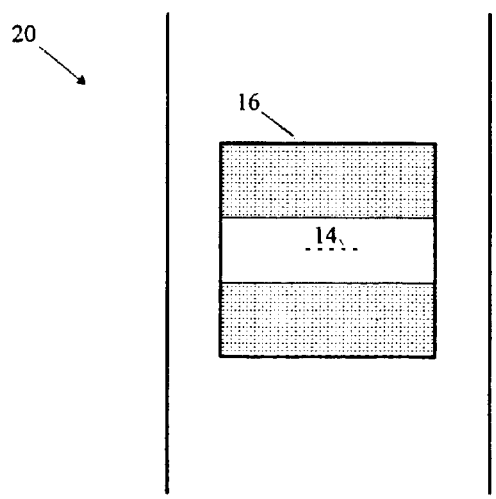

FIGS. 2 and 3 show specimens with an internal debond 18 (FIG. 2) and an external debond 20 (FIG. 3). The debonded areas of the patches are shown in cross hatching. That is, in an internal debond crack 14 is covered by a part of patch 16 that has become debonded from the skin; in an external debond the part of patch 16 that is over crack 14 is bonded to the skin, but the. edges of patch 16 have become debonded. In both cases the graphite fibers are as in FIG. 1—parallel to the direction of the applied force and perpendicular to the crack.

FIG. 4 shows the results of testing these patched specimens, as well as two control (unpatched) specimens. The control specimens were tested until they failed, at fewer than 6600 cycles. The patched specimens were tested to 40,000 cycles in tension at a stress of 16,000 pounds per square inch with only minimal crack lengthening of about 22% (since the patches were on only one side of the specimen, the crack length was visible on the other side). As can be seen, the location of the debond made essentially no difference in the performance of the patch; that is, a patch with an internal debond performed as well as a patch with an external debond, within the limits of the experimental scatter of the data.

FIG. 5 shows a front view of specimens 22 used to study the growth of debonds; FIG. 6 shows specimens 22 in side view. The specimens, designed to be simplified models of a patched crack, are fiberglass/epoxy sheets 24 butted against each other with a graphite/epoxy patch 26 on each side of the joint. Space 28 between the two sheets simulates a crack with its tips far to either side of the sheets, i.e. simulates the central region of the crack. Fiberglass/epoxy sheets were used instead of aluminum to avoid the complicating effects of gradient stress fields or thermal mismatch stresses present in a sheet of cracked aluminum as well as enhance the contrast of the X-rays used to measure the debond growth.

Specimens 22 were two inches wide and 11.5 inches long between the loading tabs; patches 26 were four inches long and centered over the joint. The thickness of the specimens was chosen to simulate the stiffness of the 0.036 inch aluminum usually used in transport aircraft skin. Although patches are normally applied to only one side of an airplane skin, the necessity of representing a curved pressurized structure with a flat test specimen required the use of two patches, one on each face of the specimen, to eliminate the effects of the inappropriately high bending moments that would arise by using a single patch on the relatively thick fiberglass/epoxy sheet. These bending moments are not significant on a curved fuselage surface. The patches were constructed of unidirectional graphite/epoxy. In service, patches normally have approximately the same stiffness as the base sheet. Thus, on these specimens, each patch had approximately half the stiffness of the base sheet.

Figure 8:
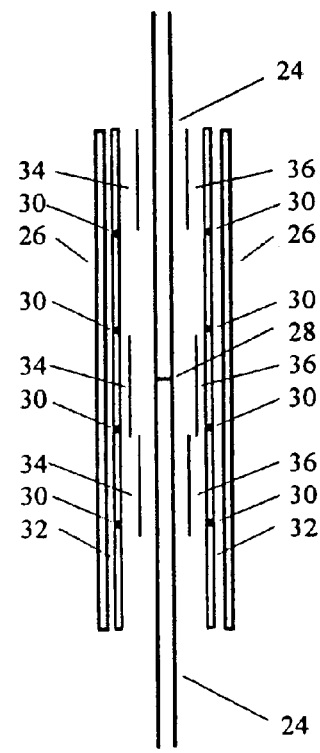
FIG. 8 shows a cross-section of the specimens used in the debond initiation tests.

Two types of barriers were used to create gaps 30: a non-stick substance with a 0.011 inch diameter circular cross section, and strips of soft rubber sheet approximately 0.050 inch wide by 0.010 inch thick. The barriers were spaced 0.8 inch from center to center symmetrically about the crack. Double layers of 0.030 lb/ft² Cytec FM-73M adhesive 32 (see FIG. 8) were used on these specimens. The nominal precured thickness of the adhesive layers is 0.005 inch, but it usually reduces to 0.003 inch after the flow stage of the cure. Thus both barriers were slightly thicker than the nominal adhesive layer, but there was enough flow near the barriers during curing to assure a continuous adhesive layer between the specimens and the patches. Attempts were made to use an air gap, but as expected the adhesive appeared to flow enough during curing to essentially eliminate the gap.

Four specimens with each type of barrier were tested. Two specimens in each set of four were tested to evaluate the potential for the barriers themselves to initiate debonds, the other two were tested to assess the ability of the barriers to arrest debond growth. In these latter two specimens, non-stick inserts were used to create debonds in several areas. The arrangement of these areas is shown in front view in FIG. 7 and in side view in FIG. 8. Cross-hatched inserts 34 were placed on one side of the specimen, and non cross-hatched inserts 36 were placed on the other side of the specimen. Two crucial differences between inserts 34 and 36 on the one hand and the barriers on the other hand are that (1) the barriers are smooth on the microscale whereas the inserts are not, and (2) the inserts prevent bonding between the adhesive and one adherend whereas the barriers prevent continuity of the adhesive layer in a zone extending between the two adherends.

The specimens were cycled to a far field strain consistent with that of aluminum experiencing a stress of 16,000 pounds per square inch. Since the aluminum used in transport aircraft skin is about four times as stiff as fiberglass/epoxy sheets 24, fiberglass/epoxy sheets 24 were approximately four times as thick and the nominal stress level was about one fourth as high. Nonetheless, the loads and stress seen by the patch and adhesive layers were appropriate because they are governed by the strain distribution.

Every 10,000 cycles specimens 22 were removed from the testing machine and the edges were swabbed with 1,4-diiodubutane dye penetrant. After allowing time for the dye to penetrate under the insert, the specimens were X-rayed.

Figure 7:
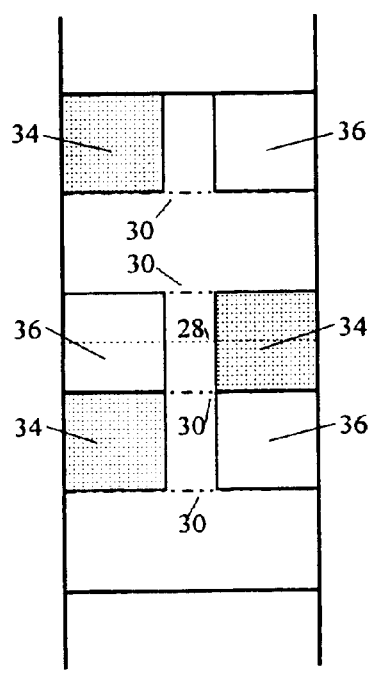
FIG. 7 shows the locations of the inserts used in the debond initiation tests.
Figure 9:
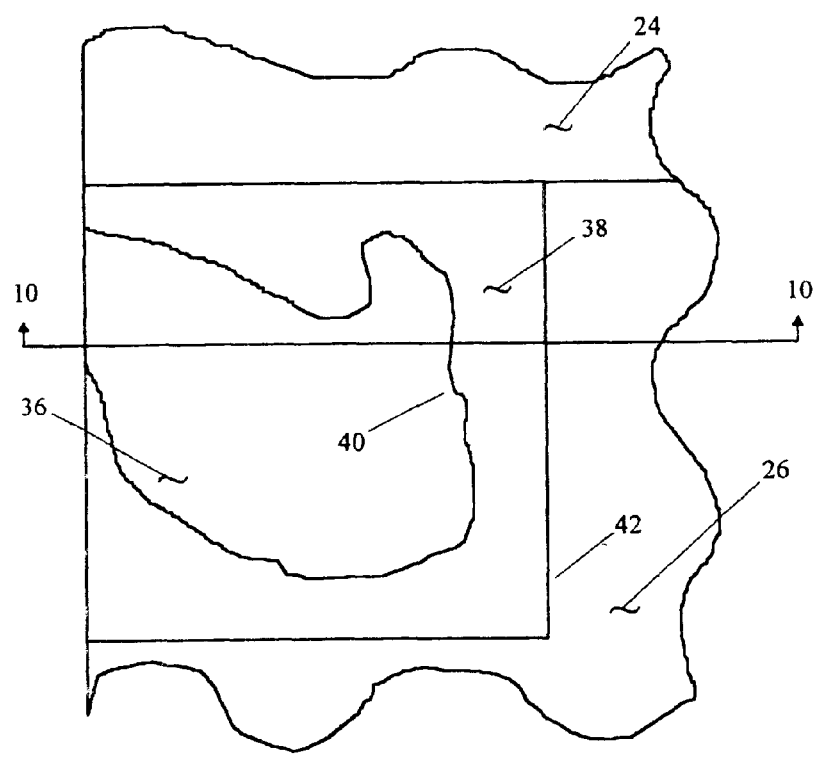
FIG. 9 shows an X-ray of a debond test specimen.

FIG. 9 is a representative radiograph of one of the specimens shown in FIG. 7 showing the debonding associated with non-stick insert 36 at the corner of patch 26 after 40,000 cycles. The unpatched region of fiberglass/epoxy sheet 24 is at the top (the upper edge of patch 26 coincides with the upper edge of insert 36). The approximately square region is insert 36, which is not bonded to fiberglass/epoxy sheet 24. Irregular area 38 indicates the thickest layer of dye penetrant in the volume under insert 36. The dye penetrant has a sharply defined inner boundary 40 which is its meniscus. Outer boundary 42 of the dye penetrant is far less distinct because it is the leading edge of the debond and the dye penetrant layer is approaching zero thickness at this point. However, outer boundary 42 appears to correspond to the outer dimensions of insert 36, indicating that the inserts probably did not initiate debonding.

Figure 10:
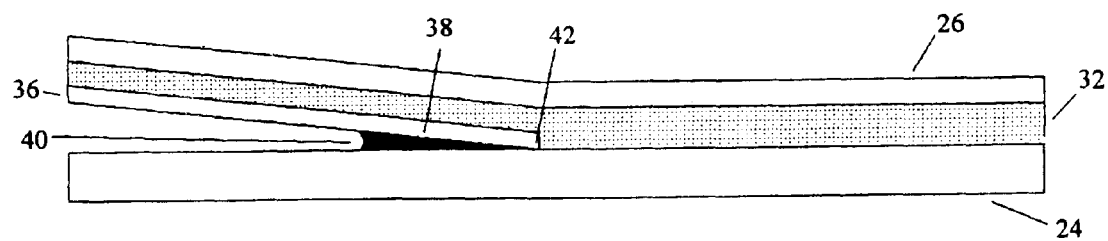
FIG. 10 shows a cross-section taken along line 10—10 in FIG. 9.

FIG. 10 is taken along line 10—10 in FIG. 9 and shows a cross-section through the specimen; the vertical scale has been exaggerated somewhat for clarity. Outer boundary 42 of the dye penetrant has been shown as extending to the edge of insert 36. This is not an exact representation, since the dye layer approaches zero thickness at this point and its location cannot be determined with precision. However, as stated above it appears to coincide with the edges of insert 36 and the debond appeared to not progress beyond insert 36.

There is a buildup of dye at the top edge of the insert, implying that the patch overlaid the top edge of the insert even though the top edge of the patch coincided with the top edge of the insert. This is caused by the fact that during the cure cycle the adhesive initially becomes thin and watery; it travelled along the top edge of the patch by capillary action, then hardened to form a dye-retaining seal. The same holds true for the buildup of dye at the lower part of the left side of the insert.

None of these specimens showed any evidence of debonds initiating from the barriers, but debonds were evident under the inserts. Unfortunately, the debond opening displacement approaches zero at the debond front, so there was insufficient contrast to conclusively determine the location of the debond front. Thus, although there was no evidence that any debond penetrated past an adhesive layer barrier or an insert, the resolution was insufficient to definitively state that the debonds grew to the barriers and stopped or that debonding was not initiated by the inserts.

The adhesive layer in the fiberglass/epoxy specimens experienced strains similar to the adhesive layer in the aluminum specimens, but none of the 64 barriers on these 8 specimens initiated a detectable debond by itself. Thus it appears that adhesive layer barriers would not induce any significant additional damage during at least 40,000 cycles. Since repairs usually occur when an aircraft has fewer than 40,000 flights remaining in its economic lifetime, this should be sufficient to insure the integrity of the barriers for the life of most repairs.

Although the present invention has been described in connection with aircraft, it obviously can be used on any structure which utilizes bonded joints or patches. Likewise, while specific materials have been enumerated for the adherends and adhesive, any combination of adherends and adhesive can utilize the present invention. The barrier can likewise comprise any material so long as it is impervious to the adhesive and its curing process and does not contribute significantly to the strength of the joint.

In the following claims the term "non-structural material" means anything that does not contribute to the strength of the bonded joint such as rubber, PTFE, cardboard, plastic, etc.

I claim:

1. An adhesive bond comprising two adherends, a layer of cured epoxy adhesive joining said adherends, and at least one gap in said adhesive layer produced by the inclusion of at least one strip of rubber in said adhesive layer.

2. The method of enhancing the damage tolerance of an adhesive bond between two adherends comprising placing a layer of adhesive between said two adherends, creating at least one gap in said adhesive by placing at least one strip of rubber in said adhesive layer, and curing said adhesive with said at least one gap remaining intact.

* * * * *